US011003350B2

(12) United States Patent
Kato (10) Patent No.: US 11,003,350 B2
(45) Date of Patent: May 11, 2021

(54) CONTROL APPARATUS, CONTROL METHOD, AND STORAGE MEDIUM

(71) Applicant: CANON KABUSHIKI KAISHA, Tokyo (JP)

(72) Inventor: Yuji Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/576,540

(22) Filed: Sep. 19, 2019

(65) Prior Publication Data

US 2020/0012421 A1 Jan. 9, 2020

Related U.S. Application Data

(63) Continuation of application No. PCT/JP2018/033398, filed on Sep. 10, 2018.

(30) Foreign Application Priority Data

Sep. 19, 2017 (JP) .............................. JP2017-179581

(51) Int. Cl.
*G06F 3/0488* (2013.01)
*G06F 3/0484* (2013.01)

(52) U.S. Cl.
CPC ...... *G06F 3/04883* (2013.01); *G06F 3/04845* (2013.01)

(58) Field of Classification Search
CPC .. G06F 3/0484; G06F 3/0481; G06F 3/04888; G06F 3/04845; G06F 3/0485; G06F 3/04883; G06T 19/00
See application file for complete search history.

(56) References Cited

U.S. PATENT DOCUMENTS

| 8,839,136 | B2 | 9/2014 | Yoo |
| 9,311,750 | B2 | 4/2016 | Moore |
| 9,529,440 | B2 | 12/2016 | Piemonte |
| 2009/0322896 | A1 | 12/2009 | Yoshizumi |
| 2010/0045666 | A1 | 2/2010 | Kornmann |
| 2011/0173574 | A1* | 7/2011 | Clavin ............... G06F 3/017 715/863 |

(Continued)

FOREIGN PATENT DOCUMENTS

| CN | 1497504 A | 5/2004 |
| CN | 103634584 A | 3/2014 |

(Continued)

OTHER PUBLICATIONS

Kashiwakuma, J. et al.; A Virtual Camera Controlling Method Using Multi-Touch Gestures for Capturing Free-viewpoint Video; Proceedings of the 11th European Conference on Interactive TV and Video, pp. 67-74.

(Continued)

*Primary Examiner* — Seth A Silverman
(74) *Attorney, Agent, or Firm* — Canon U.S.A., Inc. IP Division (57) ABSTRACT

A viewpoint control unit 204 detects a user operation on a display surface for displaying a virtual-viewpoint video (S801) and controls at least one of the position and the orientation of a virtual viewpoint concerning generation of the virtual-viewpoint video in accordance with the user operation (S805, S808, S812, S814).

21 Claims, 8 Drawing Sheets

(56) References Cited

U.S. PATENT DOCUMENTS

| | | | |
|---|---|---|---|
| 2013/0321402 A1* | 12/2013 | Moore | G01C 21/3611 |
| | | | 345/419 |
| 2014/0009415 A1 | 1/2014 | Nishida et al. | |
| 2014/0362188 A1 | 12/2014 | Yokokawa | |
| 2015/0055929 A1 | 2/2015 | Van Hoff | |
| 2016/0093099 A1 | 3/2016 | Bridges | |
| 2016/0140733 A1 | 5/2016 | Gu | |
| 2016/0193983 A1 | 7/2016 | Sawada | |
| 2017/0232343 A1* | 8/2017 | Yoshioka | A63F 13/5258 |
| | | | 463/31 |
| 2018/0205925 A1* | 7/2018 | Doh | H04N 13/117 |
| 2018/0359462 A1* | 12/2018 | Shinohara | H04N 13/344 |
| 2020/0012421 A1 | 1/2020 | Kato | |

FOREIGN PATENT DOCUMENTS

| | | |
|---|---|---|
| EP | 1369822 A2 | 12/2003 |
| EP | 3605295 A1 | 2/2020 |
| JP | 2013175048 A | 9/2013 |
| JP | 2014-127735 A | 7/2014 |
| JP | 2014-215828 A | 11/2014 |
| JP | 2015-76062 A | 4/2015 |
| JP | 2015-187797 A | 10/2015 |
| JP | 2016-96449 A | 5/2016 |
| JP | 6419278 B1 | 11/2018 |
| KR | 10-2017-0007102 A | 1/2017 |
| RU | 2406150 C2 | 12/2010 |
| WO | 2019/059020 A1 | 3/2019 |

OTHER PUBLICATIONS

Lueling, Clara.; Multi-touch Gestures for 3D Environment Systems; User Behavior, Hauptseminar Medieninformatik SS 2012, pp. 20-27.

Junya Kashiwakuma et al.; A 3D Free-Viewpoint Video Browsing Interface with Multi-Touch Manipulation;VRSJ the 16th Annual Conference, pp. 674-677.

Mungenbat Enkhbayar et al; Study on 3D Space Navigation Methods for Tablets; VRSJ the 17th Annual Conference, pp. 37-38.

Damien Marchal, et al., Designing Intuitive Multi-touch 3D Navigation Techniques, Interact 2013, Part I, LNCS 8117, pp. 19-36, XP047421747.

* cited by examiner

CONTROL APPARATUS, CONTROL METHOD, AND STORAGE MEDIUM

CROSS-REFERENCE TO RELATED APPLICATIONS

This application is a Continuation of International Patent Application No. PCT/JP2018/033398, filed Sep. 10, 2018, which claims the benefit of Japanese Patent Application No. 2017-179581, filed Sep. 19, 2017, both of which are hereby incorporated by reference herein in their entirety.

TECHNICAL FIELD

The present invention relates to a method of controlling a virtual viewpoint.

BACKGROUND ART

Virtual-viewpoint video generating technologies are known, which generate videos of arbitrary viewpoints from multiple videos captured by multiple cameras having different viewpoints. Methods of generating the virtual-viewpoint videos based on predetermined moving paths of the virtual viewpoints and methods of generating the virtual-viewpoint videos in accordance with the positions, the attitudes, and so on of the virtual viewpoints specified by viewers or the likes are known as the methods of generating the virtual-viewpoint videos (rendering methods).

With the virtual-viewpoint video generating technologies, it is possible for the viewers to view the videos of high interactivity. In contrast, with devices, such as tablets and smartphones, which use touch panels as main interfaces, it is difficult to desirably operate the viewpoints. PTL 1 describes selection of one of multiple pieces of viewpoint coordinate data and one of multiple pieces of rotation start point data by a user and inputting of the rotation angle and the amount of movement of the viewpoint to set the viewpoint.

CITATION LIST

Patent Literature

PTL 1 Japanese Patent Laid-Open No. 2015-187797

The method in PTL 1 use many operation procedures for setting the virtual viewpoint. It is an object of the present invention to enable the virtual viewpoint to be more easily set.

SUMMARY OF INVENTION

In order to resolve the above problem, a control apparatus according to the present invention has the following configuration. Specifically, the control apparatus includes detecting means for detecting a user operation on a display surface for displaying a virtual-viewpoint video and control means for controlling at least one of the position and the orientation of a virtual viewpoint concerning generation of the virtual-viewpoint video in accordance with the user operation detected by the detecting means.

Further features of the present invention will become apparent from the following description of exemplary embodiments with reference to the attached drawings.

DESCRIPTION OF EMBODIMENTS

Embodiments of the present invention will herein be described with reference to the drawings. The embodiments described below are not intended to limit the present invention and all the combinations of features described in the embodiments are not necessarily essential to resolution of the present invention. The same reference numerals are used to identify the same components for description.

First Embodiment

An example is described in a first embodiment, in which a user controls the position, the orientation, and so on of a virtual viewpoint by operating a display screen (touch panel) to generate a virtual-viewpoint video corresponding to the position, the orientation, and so on of the virtual viewpoint. In the present embodiment, "changing the position of a virtual camera" and "changing the position of the virtual viewpoint" are used to have the same meaning. In addition, "changing the attitude of the virtual camera" and "changing the orientation of the virtual viewpoint" are used to have the same meaning.

In the present embodiment, the virtual-viewpoint video is a video that is generated based on multiple videos captured by multiple cameras that captures images of their fields (image capturing target areas) from different directions and is a video that is generated in accordance with the position, the attitude, and so on of the virtual viewpoint (the virtual camera). The virtual-viewpoint video of the present embodiment may be video data resulting from compression of each image frame using a certain moving-image compression method, may be video data resulting from compression of each image frame using a certain still-image compression method, or may be video image that is not compressed.

Figure 1:
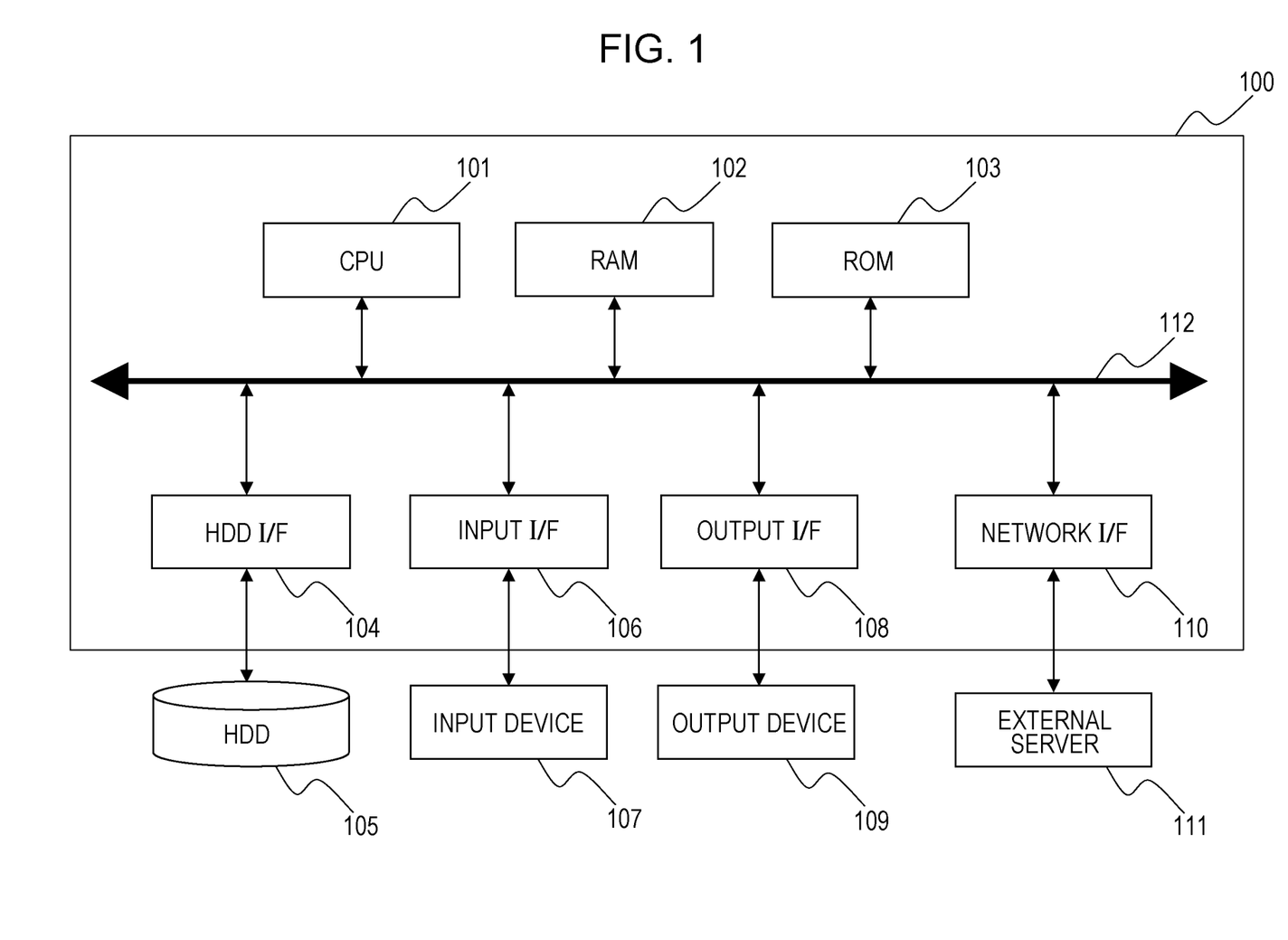
FIG. 1 is a block diagram illustrating the hardware configuration of a control apparatus 100.

An exemplary system configuration of a control apparatus 100 in the present embodiment will now be described with reference to FIG. 1. Referring to FIG. 1, a central processing unit (CPU) 101 executes programs stored in a read only memory (ROM) 103 and/or a hard disk drive (HDD) 105 using a random access memory (RAM) 102 as a working memory to control components described below via a system bus 112. This performs various processes described below. An HDD interface (I/F) 104 is an interface, such as a serial advanced technology attachment (ATA) ((SATA)), with which the control apparatus 100 is connected to a secondary storage, such as the HDD 105 or an optical disk drive. The CPU 101 is capable of reading out data from the HDD 105 via the HDD interface (I/F) 104 and writing data into the HDD 105 via the HDD interface (I/F) 104. In addition, the CPU 101 decompresses data stored in the HDD 105 into the RAM 102. Furthermore, the CPU 101 is capable of storing a variety of data in the RAM 102, which results from the execution of the programs, in the HDD 105. An input interface (I/F) 106 is used to connect an input device 107, such as a touch panel, a keyboard, a mouse, a digital camera, or a scanner, for inputting one or more coordinates to the control apparatus 100. The input interface (I/F) 106 is a serial bus interface, such as Universal Serial Bus (USB) or Institute of Electrical and Electronic Engineers (IEEE) 1394. The CPU 101 is capable of reading data from the input device 107 via the input I/F 106. An output interface (I/F) 108 is a video output interface, such as a digital visual interface (DVI) or a high-definition multimedia interface (HDMI) (registered trademark), with which an output device 109, such as a display, is connected to the control apparatus 100. The CPU 101 is capable of supplying data concerning the virtual-viewpoint video to the output device 109 via the output I/F 108 to cause the output device 109 to display the virtual-viewpoint video. A network interface (I/F) 110 is a network card, such as a local area network (LAN) card, with which the control apparatus 100 is connected to an external server 111. The CPU 101 is capable of reading data from the external server 111 via the network I/F 110.

An example will be mainly described in the present embodiment, in which the input device 107 is the touch panel of the control apparatus 100. In other words, the control apparatus 100 may a smartphone or a tablet terminal. In this case, the input device 107 (the touch panel) and the output device 109 (the display screen) are integrated with the control apparatus 100. In addition, all the components illustrated in FIG. 1 are not essential. For example, in playing back of the virtual-viewpoint video stored in the HDD 105, the external server 111 is not necessary. In contrast, in generation of the virtual-viewpoint video acquired from the external server 111, the HDD 105 is not necessary. Furthermore, the control apparatus 100 may include multiple CPUs 101. Furthermore, the control apparatus 100 may include one or more pieces of dedicated hardware different from the CPU 101 or a graphics processing unit (GPU) and at least part of the processing by the CPU 101 may be performed by the GPU or the dedicated hardware. The dedicated hardware is exemplified by, for example, an application specific integrated circuit (ASIC), a field programmable gate array (FPGA), or a digital signal processor (DSP).

A method of controlling the virtual camera according to the intention of the user in accordance with a user operation using the touch panel will be described in the present embodiment. The user operation in the present embodiment shall at least include a tap operation, sliding operations with one to three fingers, and pinch-in and pinch-out operations.

Even a beginner is capable of easily performing the user operation with one finger while it is difficult to input complicated information using the user operation with one finger. It is difficult to perform detailed works using the user operation with three fingers. Accordingly, simple processes to control the virtual camera are allocated to the user operation with one finger and the user operation with three fingers (the sliding operations). A complicated process to control the virtual camera is allocated to the operation with two fingers.

Figure 3:
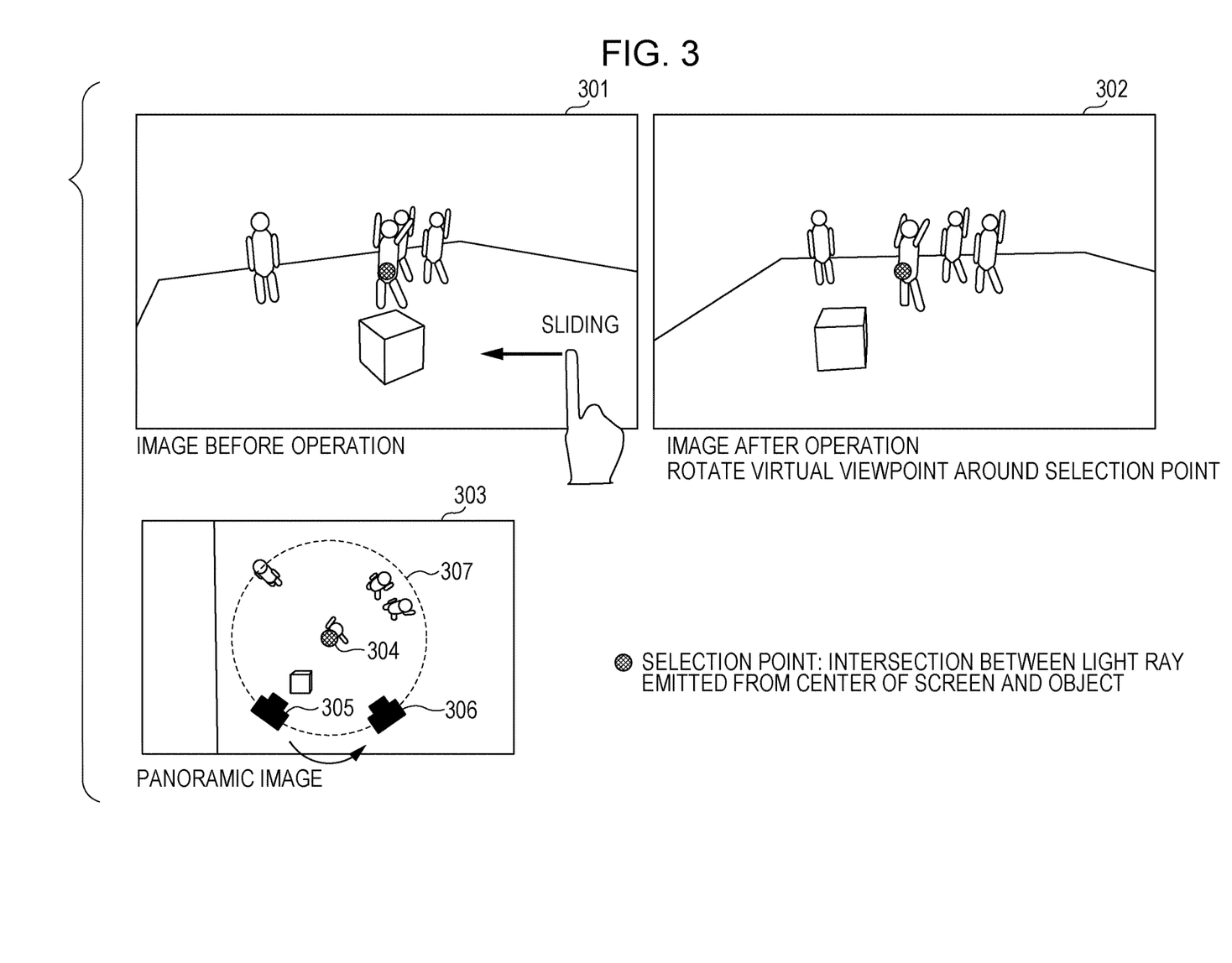
FIG. 3 is a diagram illustrating an example of how a virtual viewpoint is controlled in response to a sliding operation with one finger in a first embodiment.

The relationship between specific user operations and the behaviors of the virtual camera will be described with reference to FIG. 3 to FIG. 6. FIG. 3 illustrates how the position and the attitude of the virtual camera are varied in response to the sliding operation with one finger. In response to the leftward sliding operation with one finger to an image 301 before the user operation, the position and the attitude of the virtual camera are changed to display an image 302. Here, the position and the attitude of the virtual camera are varied from a virtual viewpoint 305 to a rightward virtual viewpoint 306 around the center of a point 304 on a three-dimensional space, which is drawn at the center of a panoramic image 303. In other words, when the number of the coordinates on the display screen (a display surface), which are concurrently specified with the user operation, is a first number (one), a viewpoint control unit 204 turns the virtual camera around a certain target coordinate in accordance with the movement of the coordinate. In other words, when the number of the coordinates on the display surface, which are concurrently specified with the user operation, is the first number (one), the viewpoint control unit 204 controls the virtual camera so that the virtual camera moves while focusing on the certain target coordinate in accordance with the movement of the coordinate.

As illustrated in FIG. 3, when the sliding operation with one finger is detected, the movement range of the virtual camera is limited on a circle 307 and the movement direction of the virtual camera is limited to the horizontal direction. This enables the movement of the virtual camera according to the intention of the user to be performed, for example, by the user who is inexperienced in a touch operation or in a usage scene in which the trajectory of touching is likely to be shifted. Accordingly, it is possible to easily generate the virtual-viewpoint video with no shake, as in Bullet-time.

Figure 4:
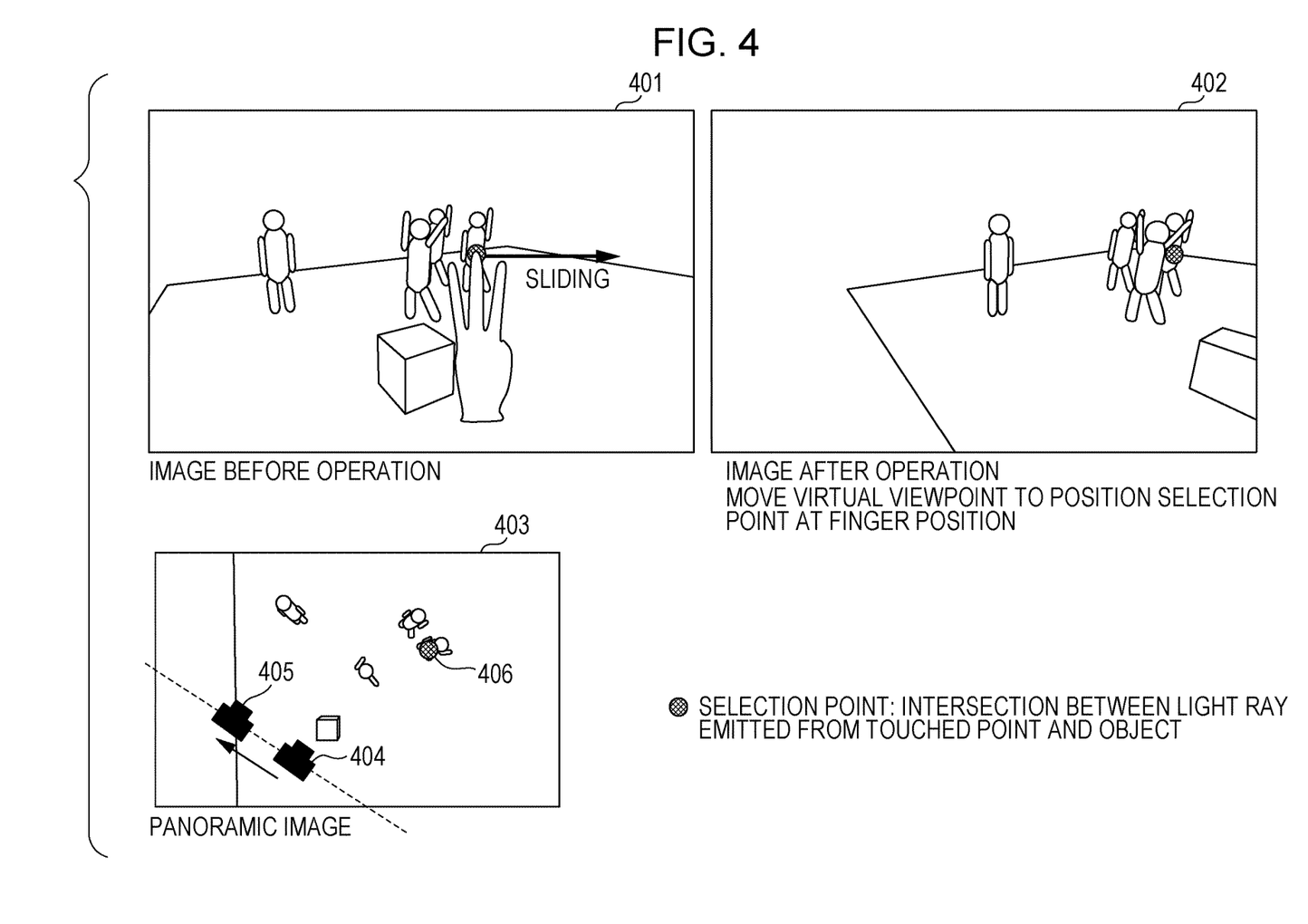
FIG. 4 is a diagram illustrating an example of how the virtual viewpoint is controlled in response to a sliding operation with three fingers in the first embodiment.

FIG. 4 illustrates how the position of the virtual camera is varied in response to the sliding operation with three fingers. In response to the rightward sliding operation with three fingers to an image 401 before the user operation, the position of the virtual camera is changed to display an image 402. Here, the position of the virtual camera is moved from a virtual viewpoint 404 to a virtual viewpoint 405, as illustrated in a panoramic image 403. In other words, when the number of the coordinates on the display screen, which are concurrently specified with the user operation, is a third number (three), the viewpoint control unit 204 controls the position of the virtual camera so that the virtual camera is translated in the three-dimensional space in accordance with the variation of the coordinate.

"The three coordinates are concurrently specified" is not limited to the case in which three fingers concurrently touch the display screen. For example, a case in which the third finger touches the display screen while keeping a state in which two fingers are touching the display screen is determined to be in the state in which three fingers concurrently touch the display screen. As described above, the multiple coordinates may be concurrently specified even if the touching of the display screen is started at different timings by different fingers.

The viewpoint control unit 204 of the present embodiment moves the virtual camera so that the amount of movement of the finger (fingers) on the display screen is equal to the amount of movement of the drawing position in the virtual-viewpoint video of a three-dimensional point 406 identified in accordance with a user operation. Making the amount of movement of the finger (fingers) equal to the amount of movement of the three-dimensional point 406 enables the user to control the virtual camera more intuitively. However, the control may be performed so that the amount of movement of the finger (fingers) is different from the amount of movement of the drawing position of the three-dimensional point 406 in the virtual-viewpoint video. In addition, in the user operation with three fingers, the average value of the amounts of movement of the respective three fingers may be used, the median may be used, a representative value may be used, or another value may be used as the amount of movement of the fingers. Furthermore, in the present embodiment, when the sliding operation with three fingers is performed, the position of the virtual camera is changed while the attitude of the virtual camera is not changed. In other words, when the number of the coordinates on the display screen, which are concurrently specified with the user operation, is the third number (three), the viewpoint control unit 204 changes the position of the virtual camera in accordance with the variation of the coordinates and does not change the orientation of the virtual viewpoint.

Figure 5:
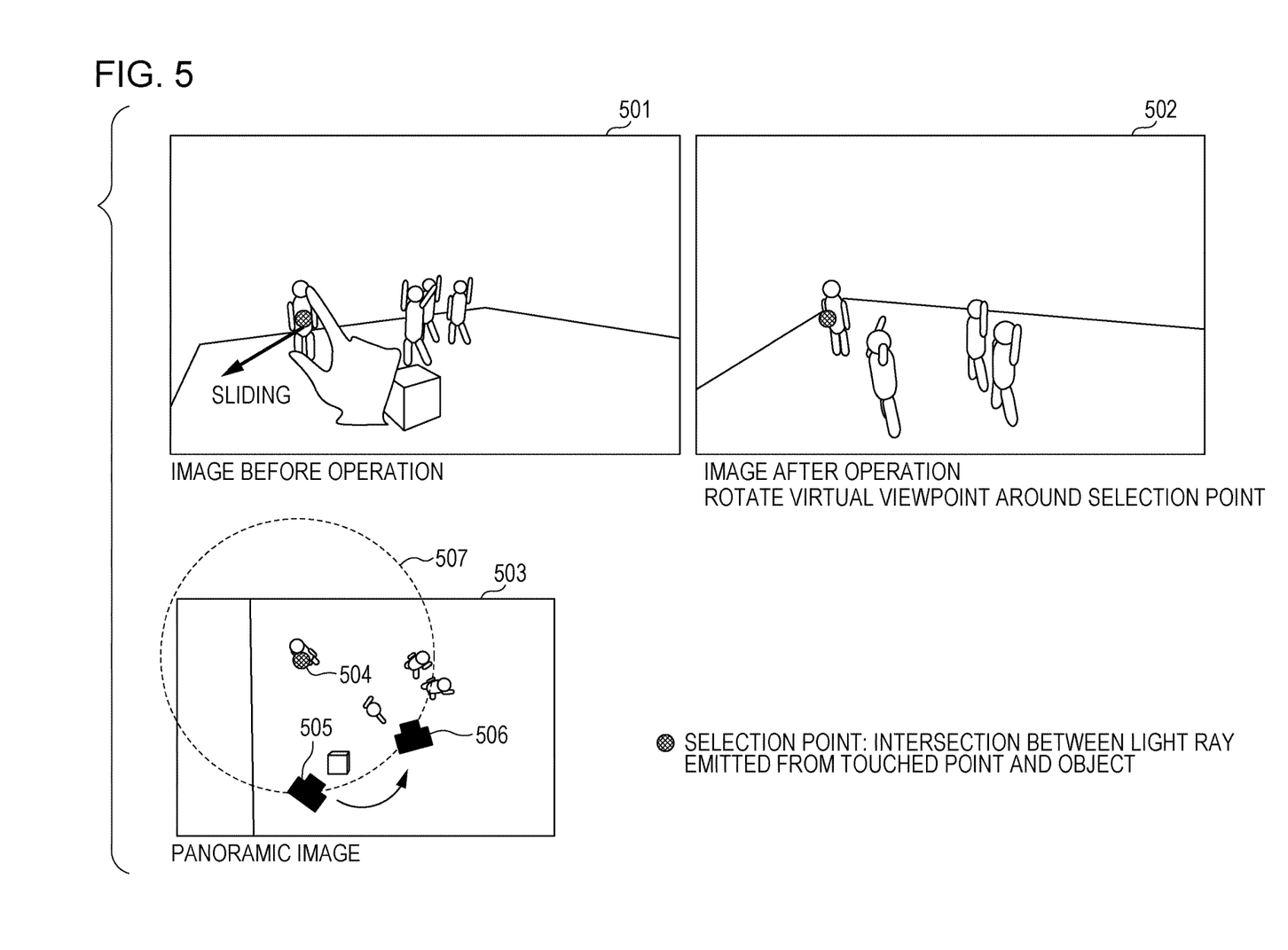
FIG. 5 is a diagram illustrating an example of how the virtual viewpoint is controlled in response to a sliding operation with two fingers in the first embodiment.

FIG. 5 illustrates how the position and the orientation of the virtual camera are varied in response to the sliding operation with two fingers. In response to the sliding operation in the lower left direction with two fingers to an image 501 before the user operation, the position and the attitude of the virtual camera are changed to display an image 502. Here, the position and the attitude of the virtual camera are varied from a virtual viewpoint 505 to a virtual viewpoint 506 around a three-dimensional point 504 determined based on the positions of the fingers of the user, as illustrated in a panoramic image 503. The movement range of the virtual camera is limited to a sphere 507. As described above, the position in the height direction of the virtual camera is not changed and the position in the horizontal direction thereof is changed when the sliding operation with one finger is performed while both of the positions in the height direction and the horizontal direction of the virtual camera are changed when the sliding operation with two fingers is performed. In other words, when the number of the coordinates on the display screen, which are concurrently specified with the user operation, is a second number (two), the viewpoint control unit 204 changes the position of the virtual camera in a first direction and a second direction in accordance with the movement of the coordinate. As described above, the control apparatus 100 of the present embodiment performs the more complicated controlling process of the virtual camera when the sliding operation with two fingers is performed, compared with the case in which the sliding operation with one finger is performed. The sliding operation with two fingers enables the virtual-viewpoint video in which an arbitrary object is viewed from an arbitrary direction to be generated.

Figure 6:
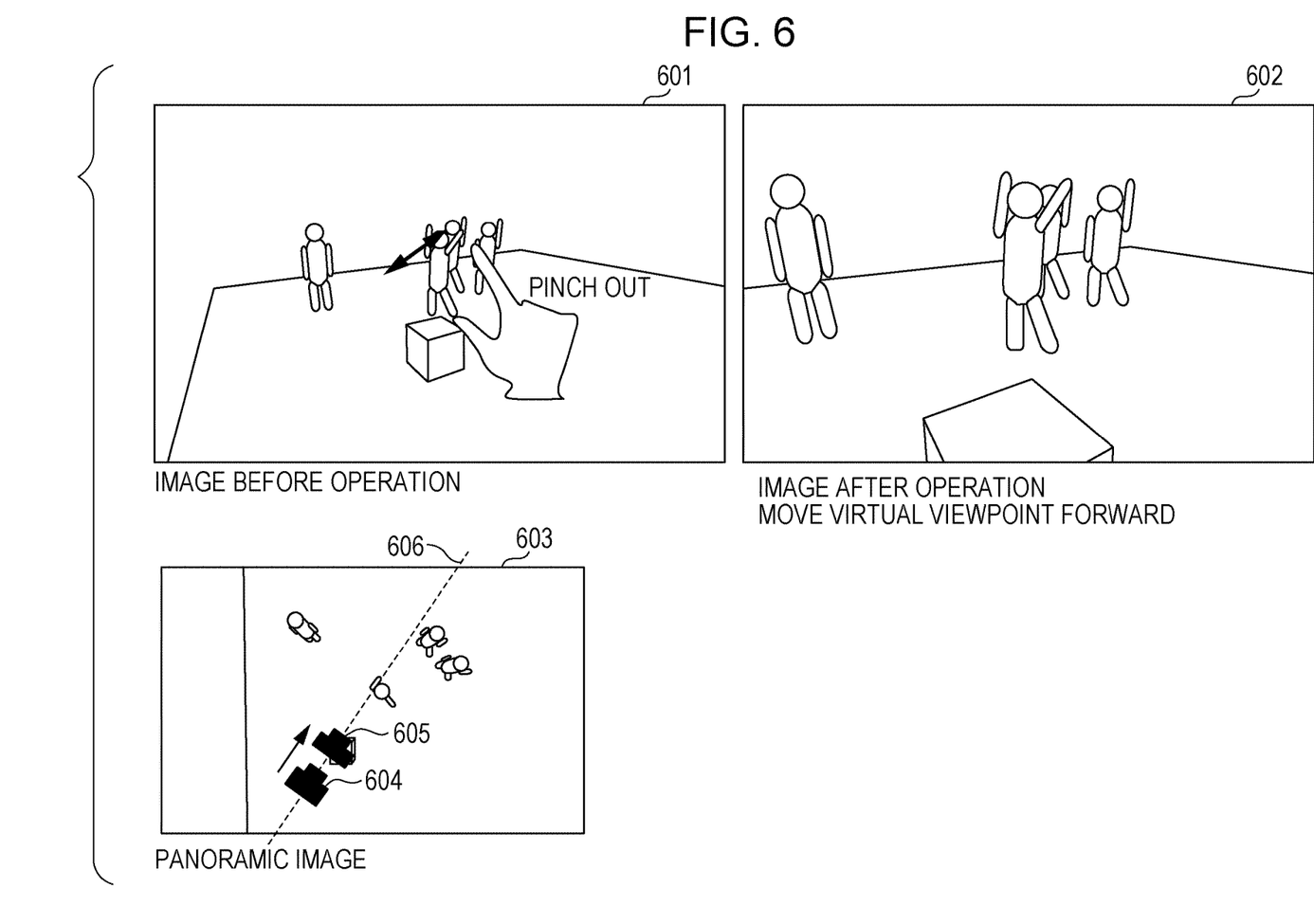
FIG. 6 is a diagram illustrating an example of how the virtual viewpoint is controlled in response to a pinch-out operation with two fingers in the first embodiment.

FIG. 6 illustrates how the position of the virtual camera is varied in response to the pinch-out operation with two fingers. In response to the pinch-out operation to an image 601 before the user operation, the position of the virtual camera is changed to display an image 602. Here, the position of the virtual camera is moved from a virtual viewpoint 604 to a virtual viewpoint 605, as illustrated in a panoramic image 603. When the pinch-in operation with two fingers is performed, the position of the virtual camera is moved from the virtual viewpoint 605 to the virtual viewpoint 604. In other words, when the number of the coordinates on the display screen, which are concurrently specified with the user operation, is the second number (two), the viewpoint control unit 204 moves the virtual camera in a direction corresponding to the viewpoint direction of the virtual camera in accordance with the variation of the coordinate.

The position of the virtual camera is moved in the front-back direction, as illustrated by a dotted line 606, in response to the pinch-in operation and the pinch-out operation. Since a subject (for example, an object such as a player) is displayed in a larger manner by an amount corresponding to the increase of the spacing between the fingers and the subject is displayed in a smaller manner by an amount corresponding to the decrease of the spacing between the fingers, an intuitive operation is capable of being performed. As described above, enabling the movement in the front-back direction and the rotation of the virtual camera in response to the user operation with two fingers realizes the control of the virtual camera with a high degree of freedom. Instead of changing the position of the virtual camera in response to the pinch-in operation and the pinch-out operation, a parameter concerning a zoom value of the virtual camera may be changed.

Although the example is mainly described in the present embodiment in which the first number is "one", the second number is "two", and the third number is "three", the present embodiment is not limited to this. For example, the first number may be "three", the second number may be "two, and the third number may be "one." Alternatively, the first number may be "one", the second number may be "two", and the third number may be "four."

Figure 2:
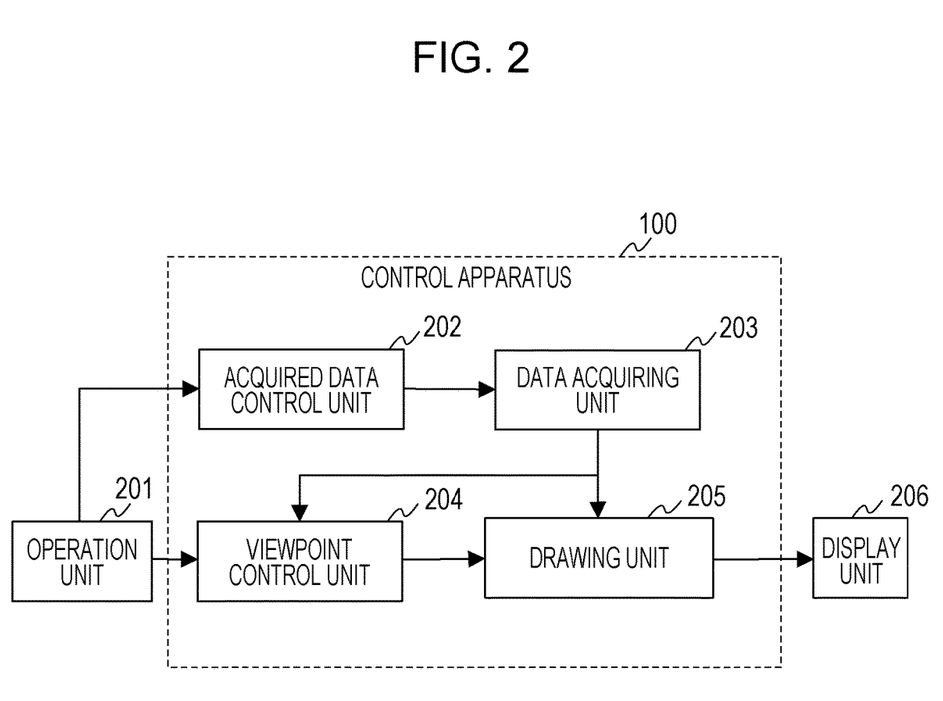
FIG. 2 is a block diagram illustrating the functional configuration of the control apparatus 100.

A process flow performed by the control apparatus 100 of the present embodiment will now be described with reference to FIG. 2 and FIG. 7. FIG. 2 is a block diagram illustrating the functional configuration of the control apparatus 100 in the present embodiment. The CPU 101 reads out the programs stored in the ROM 103 and/or the HDD 105 and executes the programs using the RAM 102 as a working area to serve as the respective functional blocks in the control apparatus 100 illustrated in FIG. 2. An operation unit 201 and a display unit 206 in FIG. 2 correspond to the input device 107 and the output device 109 in FIG. 1, respectively. The CPU 101 does not necessarily serve as all the functional blocks in the control apparatus 100 and dedicated processing circuits corresponding to the respective functional blocks may be provided.

Figure 7:
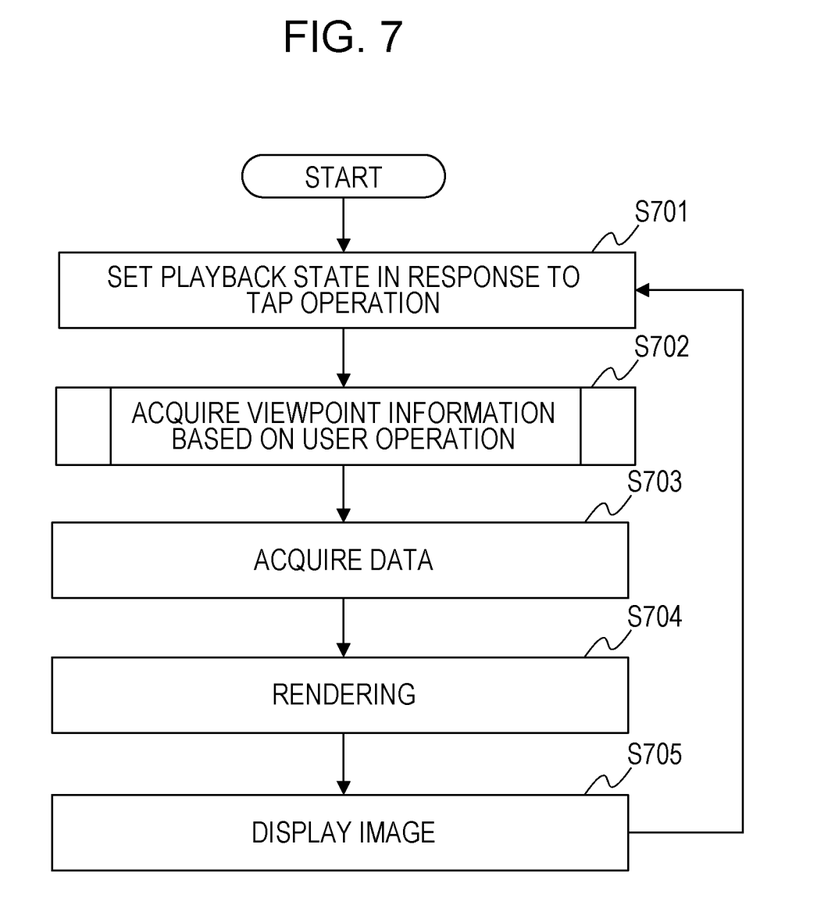
FIG. 7 is a flowchart illustrating a process flow in the control apparatus 100 of the first embodiment.

FIG. 7 is a flowchart illustrating the process flow performed in the control apparatus 100 of the present embodiment. The respective steps described using FIG. 7 are realized by the CPU 101 in the control apparatus 100, which reads out the programs stored in the ROM 103 and/or the HDD 105 and executes the programs using the RAM 102 as the working area.

In S701, an acquired data control unit 202 waits for detection of the tap operation with the operation unit 201. The tap operation is an operation to touch the display screen with a finger for a short time. An arbitrary value may be set as a threshold value of a contact time used in the determination of the tap operation. If the current playback of the virtual-viewpoint video in the display unit 206 is in a pause state when the tap operation is detected, the acquired data control unit 202 performs change to a playback state. In contrast, if the control apparatus 100 is in the playback state of the virtual-viewpoint video when the tap operation is detected, the acquired data control unit 202 performs change to the pause state of the virtual-viewpoint video. Since the acquired data control unit 202 changes the playback state of the virtual-viewpoint video in response to the tap operation on the display screen in the above manner, the user is capable of switching the playback state with the intuitive operation. However, S701 is not an essential step.

In S702, the viewpoint control unit 204 supplies camera parameters concerning the position and the attitude of the virtual camera to a drawing unit 205 based on the result of detection of the user operation with the operation unit 201. S702 will be described in detail below with reference to FIG. 8.

In S703, a data acquiring unit 203 acquires data (polygon data or texture data) necessary for rendering from the HDD 105 or the external server 111 and supplies the data to the drawing unit 205. The data acquiring unit 203 acquires the data necessary for rendering of the next image frame in a state in which the virtual-viewpoint video is being played back as a moving image. In contrast, the data acquiring unit 203 acquires the data necessary for rendering of the image frame that is currently being played back if the playback of the virtual-viewpoint video is in the pause state. In the pause state, the data may not be acquired.

In S704, the drawing unit 205 generates the virtual-viewpoint video based on the data acquired from the data acquiring unit 203 and the camera parameters acquired from the viewpoint control unit 204 and supplies the generated virtual-viewpoint video to the display unit 206. In S705, the display unit 206 displays the virtual-viewpoint video acquired from the drawing unit 205. Since an existing technology is capable of being used for the rendering, the rendering is not described in detail here. The camera parameters are capable of being classified into an external parameter and an internal parameter of the virtual camera. The external parameter of the virtual camera is a parameter representing the position and the attitude of the virtual camera. The internal parameter of the virtual camera is a parameter representing optical characteristics of the virtual camera. The external parameter and the internal parameter will now be described more specifically. The external parameter of the virtual camera is capable of being represented in the following manner where the vector representing the position of the virtual camera is denoted by t and the matrix representing the rotation is denoted by R.

$$\begin{bmatrix} R & t \\ 0 & 1 \end{bmatrix}$$ [Formula 1]

Here, the coordinate system is described as a left-handed coordinate system. At the virtual viewpoint, the right direction is a +x direction, the upper direction is a +y direction, and the forward direction is a +z direction.

An internal parameter K of the virtual camera is capable of being represented in the following manner where the position of a principal point of the virtual-viewpoint video is denoted by $(c_x, c_y)$ and the focal length of the virtual camera is denoted by f.

$$K = \begin{bmatrix} f & 0 & c_x \\ 0 & f & c_y \\ 0 & 0 & 1 \end{bmatrix}$$ [Formula 2]

The camera parameters may be represented by another method other than the matrix. For example, the position of the virtual camera may be represented in a three-dimensional coordinate and the attitude of the virtual camera may be represented by a list of values yaw, roll, and pitch. In addition, the external parameter and the internal parameter are not limited to the above ones. For example, information representing the zoom value of the virtual camera may be acquired as the internal parameter of the virtual camera. As described above, the parameters of the virtual camera, which are used to generate the virtual-viewpoint video, have various variations. The process flow is performed in the control apparatus 100 of the present embodiment in the above manner.

Control of Virtual Camera in Accordance with User Operation

Figure 8:
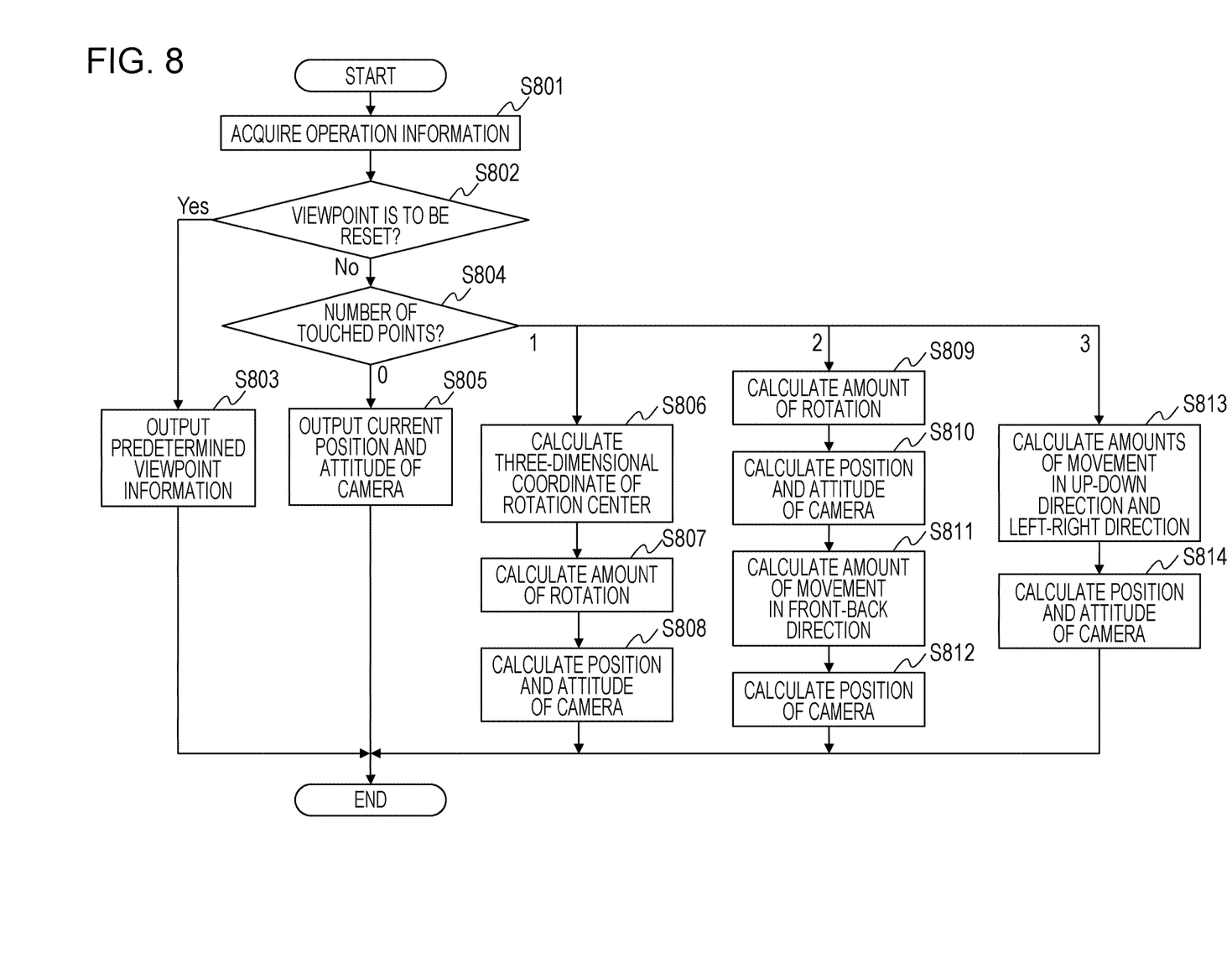
FIG. 8 is a flowchart illustrating how the virtual viewpoint is controlled in accordance with a user operation.

S702 in FIG. 7 will now be described in detail with reference to FIG. 8. In S702, the viewpoint control unit 204 acquires the result of detection of the user operation with the operation unit 201 and supplies the camera parameter of the virtual camera, which is used for drawing of the virtual-viewpoint video, to the drawing unit 205.

In S801, the viewpoint control unit 204 acquires the result of detection of the user operation with the operation unit 201. The result of detection of the user operation shall include a number n of points touched on the display screen, a two-dimensional screen coordinate $x_i$ (i=1 to n) of the touched point, and a two-dimensional screen coordinate x' of a representative point of the touched point. In addition, the result of detection of the user operation shall include a two-dimensional vector $d=(d_x, d_y)$ representing the amount of movement from the representative point in the previous image frame and a three-dimensional vector T representing the position of a three-dimensional point identified based on the representative point. However, all the pieces of information described above may not necessarily be acquired as the result of detection. For example, since the two-dimensional screen coordinate $x_i$ is equal to the two-dimensional screen coordinate x' of the representative point when an operation with one finger is performed, either of them may be omitted.

It is assumed that, in the two-dimensional screen coordinate system, the upper left corner is set to the origin, the right direction is a +x direction, and the lower direction is a +y direction. It is assumed that the representative point is a coordinate positioned at the centroid of the two-dimensional screen coordinates $x_i$ of multiple points that are touched. However, the representative point is not limited to the centroid and may be a coordinate positioned at the average of the two-dimensional screen coordinates $x_i$. Alternatively, one of the multiple two-dimensional screen coordinates $x_i$ may be selected at random as the representative point or a point that is touched for a longest time may be selected as the representative point.

It is assumed that the three-dimensional point is a point at which a light ray collides with the subject. The light ray is virtually emitted from a start point, which is the three-dimensional coordinate corresponding to the position of the virtual camera, to the image capturing direction of the virtual camera (raycast). The three-dimensional point is used as a base point of rotation or a reference point of movement in the operation of the virtual camera. In addition, the three-dimensional point is determined only when the number of touches is varied from that of the previous image frame and the three-dimensional vector T, which has been determined in the processing of the previous image frame, is used as the three-dimensional point when the number of touches is not varied from that of the previous image frame. Although the example is described in the present embodiment in which the three-dimensional point is represented by the three-dimensional vector T, the three-dimensional point may not necessarily be represented in the vector format.

In S802, the viewpoint control unit 204 determines whether the viewpoint is to be reset in response to the user operation with the operation unit 201. In the present embodiment, it is determined that the viewpoint is to be reset if a certain area (for example, an area in which a viewpoint reset button is displayed) on the display screen is tapped.

In S803, the viewpoint control unit 204 resets the position, the attitude, and so on of the virtual camera. Specifically, the viewpoint control unit 204 changes the position and the orientation of the virtual viewpoint to a predetermined position and a predetermined orientation in response to detection of the user operation at a certain position on the display screen. Then, the viewpoint control unit 204 supplies the camera parameter of the virtual camera in the resetting to the drawing unit 205. It is assumed in the present embodiment that the position of the virtual camera in the resetting is [0 0 0] and the attitude of the virtual camera is a unit matrix. However, the viewpoint information in the resetting is not limited to the above ones. For example, a value set by the user in advance may be used or recommended viewpoint information embedded in image data may be read out for use.

In S804, the viewpoint control unit 204 determines the method of controlling the virtual camera based on the number n of points that are touched. Differentiating the method of controlling the virtual camera in accordance with the number of fingers that are touched enables a more variety of control to be realized. If the number of points that are touched is zero, the process goes to S805 and the viewpoint control unit 204 supplies the current position and attitude of the virtual camera to the drawing unit 205.

If the number of points that are touched is one (that is, the operation with one finger is detected), the process goes to S806 and the viewpoint control unit 204 rotates the virtual camera around the above three-dimensional point, which is used as the center of rotation. The three-dimensional point is a point at which a light ray collides with the subject. The light ray is virtually emitted from the start point, which is the three-dimensional coordinate (for example, the coordinate of the center of the virtual camera) corresponding to the position of the virtual camera, to the image capturing direction of the virtual camera (raycast). In other words, the three-dimensional point is the coordinate on the three-dimensional space, which corresponds to the center position of the virtual-viewpoint video that is displayed in response to touching. However, the three-dimensional point is not limited to this example. S806 to S808 will be described in detail below.

If the number of points that are touched is two (that is, the operation with two fingers is detected), the process goes to S809 and the viewpoint control unit 204 performs control to change both of the positions in the height direction and the horizontal direction of the virtual camera in response to the sliding operation by the user. In S811, the viewpoint control unit 204 performs control to move the position of the virtual camera in the front-back direction in response to the pinch-in operation and/or the pinch-out operation. S809 to S812 will be described in detail below.

If the number of points that are touched is three (that is, the operation with three fingers is detected), the process goes to S813 and the viewpoint control unit 204 performs control to translate the virtual camera in response to the sliding operation. S813 and S814 will be described in detail below.

In S806, the viewpoint control unit 204 determines the coordinate of the three-dimensional point used as the center of rotation when the virtual camera is rotated. The viewpoint control unit 204 virtually emits the light ray in the three-dimensional space, for example, using the center of the virtual camera as the viewpoint in response to the detection of the touch of one finger and uses the point at which the light ray collides with the subject as the three-dimensional point. The three-dimensional point is represented as three-dimensional vector A and is used as the center of rotation.

After the three-dimensional point is determined, it is not necessary to determine the three-dimensional point again while the touch state is continued.

In S807, the viewpoint control unit 204 acquires an amount-of-movement d of the representative point to determine the amount of movement of the virtual camera. In the case of the user operation with one finger, the movement direction of the virtual camera is only the rotation direction around the three-dimensional point. In addition, in the case of the user operation with one finger, the virtual camera does not move in the vertical direction and moves only in the horizontal direction. This enables the virtual camera to be less prone to be affected by hand shake in the sliding operation to make the movement of the virtual camera smooth. The viewpoint control unit 204 of the present embodiment multiplies an amount-of-movement $d_x$ of the representative point by a scale coefficient s to determine the amount of movement (an amount of rotation θ in the horizontal direction) of the virtual camera. The scale coefficient s for determining the amount of rotation θ [degree] from the amount-of-movement $d_x$ is represented by the following equation where the resolution of the display screen is w pixels in width and the amount of rotation when the sliding operation from one end of the display screen to another end thereof is performed is 360 degrees.

$$s = \frac{w}{360} \quad \text{[Formula 3]}$$

The amount of rotation of the virtual camera is represented by the following equation using the scale coefficient:

$$\theta = s \times d_x \quad \text{[Formula 4]}$$

Although the example is mainly described in the present embodiment in which the movement direction of the virtual camera based on the user operation with one finger is only the horizontal direction, the movement direction of the virtual camera may be only the vertical direction. Whether the movement direction of the virtual camera is only the horizontal direction or only the vertical direction may be determined in accordance with the content of the user operation. Specifically, the movement direction may be determined in accordance with the direction of the sliding operation of a certain number-th image frame after the touch is detected. For example, the amount of movement in the x direction of the sliding operation at the certain number-th image frame may be compared with the amount of movement in the y direction thereof, and the virtual camera may be moved only in the horizontal direction if the amount of movement in the x direction is greater than the amount of movement in the y direction and the virtual camera may be moved only in the vertical direction if the amount of movement in the y direction is greater than the amount of movement in the x direction. In addition, the method of determining the scale coefficient s is not limited to the above one. For example, the user may specify an arbitrary value or the user may be caused to select an arbitrary one from multiple choices.

In S808, the viewpoint control unit 204 determines the position and the attitude of the virtual camera in accordance with the sliding operation by the user and supplies the result of the determination to the drawing unit 205. A position $R_n$ and an attitude $t_n$ of the virtual camera when a position $R_{n-1}$ and an attitude $t_{n-1}$ of the virtual camera is rotated around a coordinate A in the horizontal direction by θ are represented by the following equations:

$$R_n = R(\theta, 0) R_{n-1}$$

$$t_n = R(\theta, 0)(t_{n-1} - A) + A \quad \text{[Formula 5]}$$

However, $R(\theta, \varphi)$ is a rotation matrix in which the virtual camera is rotated in the horizontal direction by θ and is rotated in the vertical direction by φ. The equations to calculate the current position and attitude of the rotated virtual camera are not limited to the above ones.

In S809, the viewpoint control unit 204 acquires the amount-of-movement d of the representative point to determine the amount of movement of the virtual camera. In the case of the user operation with two fingers, the virtual camera is capable of being rotated in both the horizontal direction and the vertical direction around the three-dimensional point, unlike S807, in order to realize the control with a high degree of freedom. The amount of rotation θ in the horizontal direction and the scale coefficient s are calculated in the same manner as in S807. The amount of rotation φ in the vertical direction is represented by the following equation:

$$\varphi = s \times d_y \quad \text{[Formula 6]}$$

In S810, the viewpoint control unit 204 determines the position and the attitude of the virtual camera in accordance with the sliding operation by the user and supplies the result of determination to the drawing unit 205. The position $R_n$ and an attitude $t'_n$ of the virtual camera when the position $R_{n-1}$ and the attitude $t_{n-1}$ of the virtual camera is rotated around a three-dimensional point T in the horizontal direction by θ and in the vertical direction by φ are represented by the following equations:

$$R_n = R(\theta, \varphi) R_{n-1}$$

$$t'_n = R(\theta, \varphi)(t_{n-1} - T) + T \quad \text{[Formula 7]}$$

However, the equations to calculate the position and the attitude of the virtual camera when the virtual camera is rotated around the three-dimensional point T are not limited to the above ones. For example, use of a certain coefficient or the like enables the amount of movement of the virtual camera to be increased with respect to the amount of movement of the fingers or to be decreased with respect to the amount of movement of the fingers.

In S811, the viewpoint control unit 204 determines the amount of movement in the front-back direction of the virtual camera in accordance with the pinch-in operation and the pinch-out operation by the user. An amount of variation Δd is Δd=$d_n$−$d_{n-1}$ where the distance between the two fingers when the current image frame is displayed is denoted by $d_n$ and the distance between the two fingers when the last image frame is displayed is denoted by $d_{n-1}$. The virtual camera is moved in the front-back direction in proportion to the amount of variation. An amount of movement Δz of the virtual camera is capable of being represented by Δz=m×Δd where the degree of sensitivity of the movement is denoted by m. In other words, the amount of movement of the virtual camera is determined in accordance with the amount of movement of the fingers per unit time in response to the pinch-in operation and the pinch-out operation. The method of determining the amount of movement is not limited to the above one. For example, the amount of movement in the three-dimensional space may be determined so as to be matched with the amount of movement of the fingers on the display screen based on the distance from the virtual camera to the three-dimensional point T.

In S812, the viewpoint control unit 204 determines the position of the virtual camera in accordance with the pinch-in operation and the pinch-out operation by the user and supplies the result of determination to the drawing unit 205. The position of the virtual camera that is moved in the front-back direction by Δz is represented by the following equation:

$$t_n = t'_n + R_n \begin{bmatrix} 0 \\ 0 \\ \Delta z \end{bmatrix} \quad \text{[Formula 8]}$$

In S813, the viewpoint control unit 204 determines the amounts of movement in the up-down direction and the left-right direction of the virtual camera in accordance with the sliding operation by the user. In the present embodiment, the amount of movement is determined so that the three-dimensional point moves on the display screen by a distance equal to the amount of movement of the fingers on the display screen. Specifically, when the display position of a certain object (for example, a soccer player) is touched with three fingers and the three fingers are slid on the display screen, the position of the virtual camera is varied so as not to vary the positional relationship between the display position of the object and the three fingers. The amounts of movement Δx, Δy are represented by the following equations where the distance from the virtual camera to the three-dimensional point that is touched is denoted by r.

$$u = \frac{r}{\sqrt{(x'_x - cx)^2 + (x'_y - cx)^2 + f^2}} \quad \text{[Formula 9]}$$

$$\Delta x = u \times d_x$$

$$\Delta y = u \times d_y$$

In S814, the viewpoint control unit 204 determines the position and the attitude of the virtual camera in accordance with the sliding operation by the user and supplies the result of determination to the drawing unit 205. The position and the attitude of the virtual camera when the virtual camera moves in the left-right direction by Δx and in the up-down direction by Δy are represented by the following equations:

$$R_n = R_{n-1} \quad \text{[Formula 10]}$$

$$t_n = t_{n-1} + R_n \begin{bmatrix} \Delta x \\ \Delta y \\ 0 \end{bmatrix}$$

The correspondence relationship between the number of fingers and the content of processing is not limited to the examples described above. For example, the method of controlling the position and the attitude of the virtual camera in response to the sliding operation with one finger may be replaced with that in response to the sliding operation with three fingers. Specifically, the translation of the virtual camera in the up-down direction and the left-right direction may be performed based on the sliding operation with one finger and the rotation and movement of the virtual camera around the three-dimensional point may be performed based on the sliding operation with three fingers. In addition, the relationship between the number of fingers and the control method may be arbitrarily set by the user. This enables the operational functions more matched with the skill of the user, the display environment of the virtual-viewpoint video, and so on to be provided. Although the example is mainly described in the present embodiment in which all of the step (S805) when the number of touched points is zero, the steps (S806 to S808) when the number of touched points is one, the steps (S809 to S812) when the number of touched points is two, and the steps (S813 and S814) when the number of touched points is three are performed, the present embodiment is not limited to this example. For example, only the steps (S809 to S812) when the number of touched points is two and the steps (S813 and S814) when the number of touched points is three may be performed or only the steps (S806 to S808) when the number of touched points is one may be performed. The steps that is enabled may be switched in accordance with settings that are made by the user in advance.

As described above, the control apparatus 100 of the present embodiment controls at least one of the position and the orientation of the virtual viewpoint in accordance with the user operation on the display surface (the display screen) for displaying the virtual-viewpoint video. With such a configuration, the user is capable of performing the control concerning the virtual viewpoint more easily than before. In addition, the control apparatus 100 of the present embodiment switches the method of controlling the virtual viewpoint in accordance with the user operation depending on the number of fingers detected on the display surface (the number of the coordinates concurrently specified by the user). Adopting such a configuration enables the user to perform the control of the virtual viewpoint according to the user's intention with more intuitive operations. In other words, the control apparatus 100 of the present embodiment has the advantage of generating the virtual-viewpoint video more according to the user's intention.

OTHER EMBODIMENTS

The present invention is capable of being realized by processing in which the programs realizing one or more functions of the above embodiments are supplied to a system or an apparatus via a network or a storage medium and one or more processors in the computer in the system or the apparatus read out the programs and execute the programs. The present invention is capable of being realized by a circuit (for example, an application specific integrated circuit (ASIC)) realizing one or more functions.

According to the present invention, it is possible to more easily set the virtual viewpoint.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A control apparatus comprising:
one or more hardware processors; and
one or more memories which store instructions executable by the one or more hardware processors to cause the control apparatus to perform at least:
detecting a touch operation on a display surface for displaying a virtual-viewpoint image generated based on image data obtained by a plurality of image capturing apparatuses that captures images of an image capturing target area from different directions;
determining an amount of change of at least one of a view direction from a virtual viewpoint and a position of a virtual viewpoint corresponding to the virtual-viewpoint image based on the number of coordinates that are concurrently specified with the touch operation and an amount of variation of coordinates, so that the view direction from the virtual viewpoint and the position of the virtual viewpoint are changed from a predetermined view direction from the virtual viewpoint and a predetermined position of the virtual viewpoint in accordance with the touch operation of sliding in a predetermined direction based on variation of a first number of coordinates in a first case where the first number of coordinates are concurrently specified with the touch operation on the display surface, and so that the position of the virtual viewpoint is changed from the same predetermined position of the virtual viewpoint without the view direction from the virtual viewpoint being changed from the same view direction from the virtual viewpoint in accordance with the touch operation of sliding in the same predetermined direction based on variation of a second number of the coordinate in a second case where the second number of coordinates are concurrently specified with the touch operation on the display surface; and
controlling at least one of the view direction from the virtual viewpoint and the position of the virtual viewpoint in accordance with the determined amount of change.

2. The control apparatus according to claim 1, wherein, in the first case where the first number of coordinates are concurrently specified with the touch operation on the display surface, the position of the virtual viewpoint rotates around a predetermined position to which the virtual viewpoint is directed in accordance with the variation of the coordinates.

3. The control apparatus according to claim 2, wherein the predetermined position to which the virtual viewpoint is directed is a position that is determined based on a center of the virtual-viewpoint image which is displayed on the display surface when a coordinate on the display surface is specified with the touch operation.

4. The control apparatus according to claim 1, wherein, in the first case where the first number of coordinates are concurrently specified with the touch operation on the display surface, the view direction from the virtual viewpoint and the position of the virtual viewpoint are changed while the virtual viewpoint focuses on the target position in accordance with the variation of the coordinates.

5. The control apparatus according claim 1, wherein the first number is less than the second number.

6. The control apparatus according to claim 1, wherein the first number is greater than the second number.

7. The control apparatus according to claim 1, wherein, in the second case where the second number of the coordinates are concurrently specified with the touch operation on the display surface, the position of the virtual viewpoint is linearly moved in a three-dimensional space in accordance with the variation of the coordinates.

8. The control apparatus according to claim 1, wherein, in the second case where the second number of the coordinates are concurrently specified with the touch operation on the display surface, the position of the virtual viewpoint is linearly moved in a direction corresponding to the variation of the coordinates.

9. The control apparatus according to claim 1, wherein, in a third case where a third number of the coordinates are concurrently specified with the touch operation on the display surface, the position of the virtual viewpoint is changed in a direction corresponding to the view direction from the virtual viewpoint arranged before the third number of the coordinates are specified, in accordance with the variation of the coordinates.

10. The control apparatus according claim 1, wherein, when a certain touch operation on the display surface is detected by the detecting unit while playback of the virtual-viewpoint image on the display surface is in a pause state, the control unit changes the pause state to a playback state.

11. The control apparatus according to claim 1, wherein the control unit changes the view direction from the virtual viewpoint and the position of the virtual viewpoint to a predetermined direction and a predetermined position in response to detection of a touch operation at a specific position on the display surface.

12. The control apparatus according to claim 1, wherein one or more objects exist in the image capturing target area.

13. The control apparatus according to claim 12, wherein at least one of the objects is an athlete.

14. The control apparatus according to claim 1, wherein the first number, which is the number of concurrently specified coordinates in the first case, or the second number, which is the number of concurrently specified coordinates in the second case, is number one.

15. A control method comprising:
detecting a touch operation on a display surface for displaying a virtual-viewpoint image generated based on image data obtained by a plurality of image capturing apparatuses that captures images of an image capturing target area from different directions;
determining an amount of change of at least one of a view direction from a virtual viewpoint and a position of a virtual viewpoint corresponding to the virtual-viewpoint image based on the number of coordinates that are concurrently specified with the touch operation and an amount of variation of coordinates, so that the view direction from the virtual viewpoint and the position of the virtual viewpoint are changed from a predetermined view direction from the virtual viewpoint and a predetermined position of the virtual viewpoint in accordance with the touch operation of sliding in a predetermined direction based on variation of a first number of coordinates in a first case where the first number of coordinates are concurrently specified with the touch operation on the display surface, and so that the position of the virtual viewpoint is changed from the same predetermined position of the virtual viewpoint without the view direction from the virtual viewpoint being changed from the same view direction from the virtual viewpoint in accordance with the touch operation of sliding in the same predetermined direction based on variation of a second number of the coordinate in a second case where the second number of coordinates are concurrently specified with the touch operation on the display surface; and
controlling at least one of the view direction from the virtual viewpoint and the position of the virtual viewpoint in accordance with the determined amount of change.

16. The control method according to claim 15, wherein, in the first case where the first number of coordinates are concurrently specified with the touch operation on the display surface, the position of the virtual viewpoint rotates around a predetermined position to which the virtual viewpoint is directed in accordance with the variation of the coordinates.

17. The control method according to claim 15, wherein, in the first case where the first number of coordinates are concurrently specified with the touch operation on the display surface, the view direction from the virtual viewpoint and the position of the virtual viewpoint are changed while the virtual viewpoint focuses on the target position in accordance with the variation of the coordinates.

18. A non-transitory computer-readable storage medium storing program for causing a computer to execute a control method, the control method comprising:
detecting a touch operation on a display surface for displaying a virtual-viewpoint image generated based on image data obtained by a plurality of image capturing apparatuses that captures images of an image capturing target area from different directions;
determining an amount of change of at least one of a view direction from a virtual viewpoint and a position of a virtual viewpoint corresponding to the virtual-viewpoint image based on the number of coordinates that are concurrently specified with the touch operation and an amount of variation of coordinates, so that the view direction from the virtual viewpoint and the position of the virtual viewpoint are changed from a predetermined view direction from the virtual viewpoint and a predetermined position of the virtual viewpoint in accordance with the touch operation of sliding in a predetermined direction based on variation of a first number of coordinates in a first case where the first number of coordinates are concurrently specified with the touch operation on the display surface, and so that the position of the virtual viewpoint is changed from the same predetermined position of the virtual viewpoint without the view direction from the virtual viewpoint being changed from the same view direction from the virtual viewpoint in accordance with the touch operation of sliding in the same predetermined direction based on variation of a second number of the coordinate in a second case where the second number of coordinates are concurrently specified with the touch operation on the display surface; and
controlling at least one of the view direction from the virtual viewpoint and the position of the virtual viewpoint in accordance with the determined amount of change.

19. A control apparatus comprising:
one or more hardware processors; and
one or more memories which store instructions executable by the one or more hardware processors to cause the control apparatus to perform at least:
detecting a touch operation on a display surface for displaying a virtual-viewpoint image generated based on image data obtained by a plurality of image capturing apparatuses that captures images of an image capturing target area from different directions;

determining an amount of change of at least one of a view direction from a virtual viewpoint and a position of a virtual viewpoint corresponding to the virtual-viewpoint image based on an amount of change of a position of a finger in the touch operation, so that the view direction from the virtual viewpoint and the position of the virtual viewpoint are changed from a predetermined view direction from the virtual viewpoint and a predetermined position of the virtual viewpoint in accordance with the touch operation of sliding in a predetermined direction based on change of a position of a finger in the touch operation with one finger, and so that the position of the virtual viewpoint is changed from the same predetermined position of the virtual viewpoint without the view direction from the virtual viewpoint being changed from the same predetermined view direction from the virtual viewpoint in accordance with the touch operation of sliding in the same predetermined direction based on change of positions of fingers in the touch operation with two fingers; and controlling at least one of the view direction from the virtual viewpoint and the position of the virtual viewpoint in accordance with the determined amount of change.

20. A control method comprising:

detecting a touch operation on a display surface for displaying a virtual-viewpoint image generated based on image data obtained by a plurality of image capturing apparatuses that captures images of an image capturing target area from different directions;

determining an amount of change of at least one of a view direction from a virtual viewpoint and a position of a virtual viewpoint corresponding to the virtual-viewpoint image based on an amount of change of a position of a finger in the touch operation, so that the view direction from the virtual viewpoint and the position of the virtual viewpoint are changed from a predetermined view direction from the virtual viewpoint and a predetermined position of the virtual viewpoint in accordance with the touch operation of sliding in a predetermined direction based on change of a position of a finger in the touch operation with one finger, and so that the position of the virtual viewpoint is changed from the same predetermined position of the virtual viewpoint without the view direction from the virtual viewpoint being changed from the same predetermined view direction from the virtual viewpoint in accordance with the touch operation of sliding in the same predetermined direction based on change of positions of fingers in the touch operation with two fingers; and controlling at least one of the view direction from the virtual viewpoint and the position of the virtual viewpoint in accordance with the determined amount of change.

21. A non-transitory computer-readable storage medium storing computer program for causing a computer to execute a control method, the control method comprising:

detecting a touch operation on a display surface for displaying a virtual-viewpoint image generated based on image data obtained by a plurality of image capturing apparatuses that captures images of an image capturing target area from different directions;

determining an amount of change of at least one of a view direction from a virtual viewpoint and a position of a virtual viewpoint corresponding to the virtual-viewpoint image based on an amount of change of a position of a finger in the touch operation, so that the view direction from the virtual viewpoint and the position of the virtual viewpoint are changed from a predetermined view direction from the virtual viewpoint and a predetermined position of the virtual viewpoint in accordance with the touch operation of sliding in a predetermined direction based on change of a position of a finger in the touch operation with one finger, and so that the position of the virtual viewpoint is changed from the same predetermined position of the virtual viewpoint without the view direction from the virtual viewpoint being changed from the same predetermined view direction from the virtual viewpoint in accordance with the touch operation of sliding in the same predetermined direction based on change of positions of fingers in the touch operation with two fingers; and controlling at least one of the view direction from the virtual viewpoint and the position of the virtual viewpoint in accordance with the determined amount of change.

* * * * *